Jan. 22, 1952   W. E. BURNETT   2,583,410
SEAT STRUCTURE
Filed Jan. 3, 1947   2 SHEETS—SHEET 1
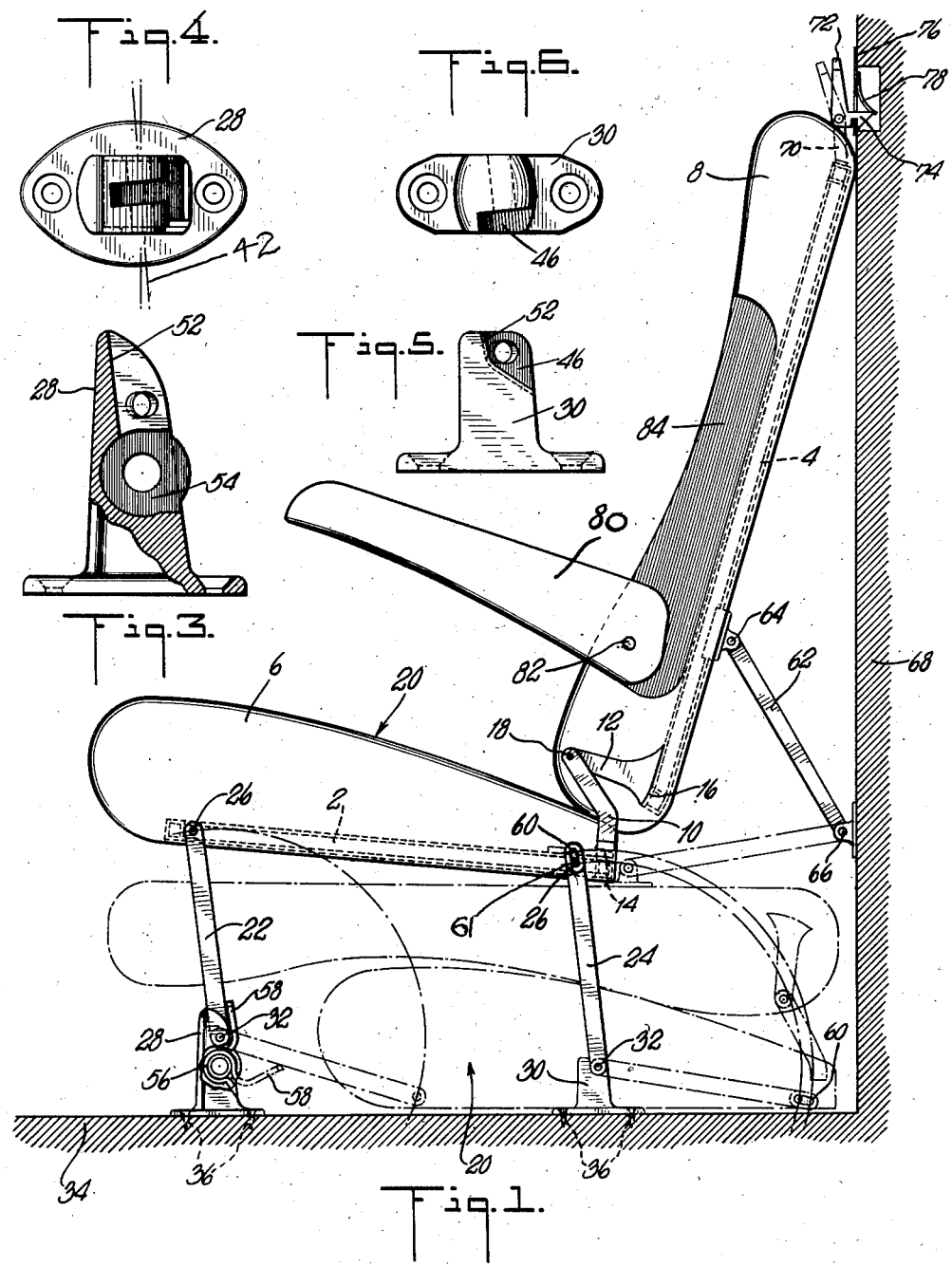
INVENTOR.
William E. Burnett
BY
George R. Ericson
ATTORNEY

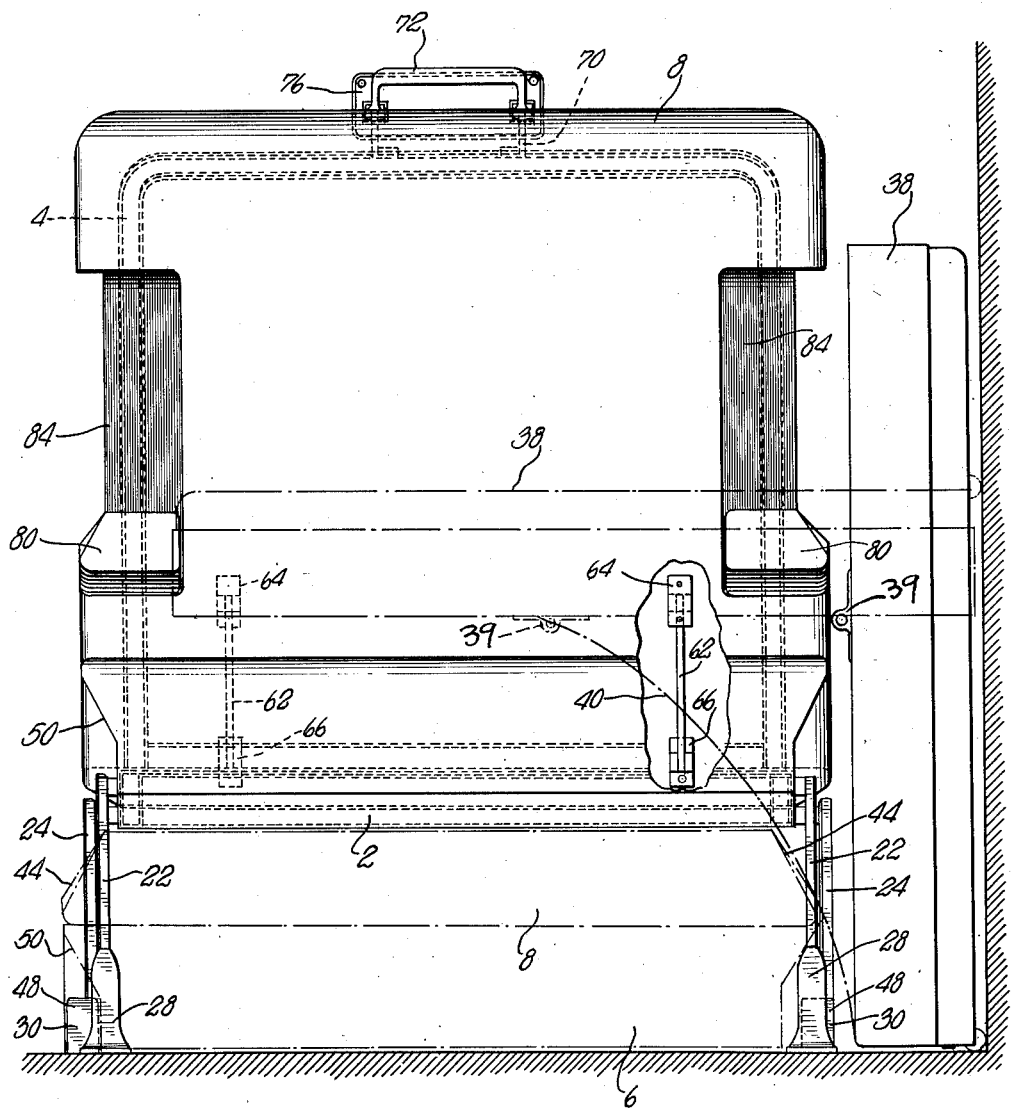

Patented Jan. 22, 1952

2,583,410

UNITED STATES PATENT OFFICE 2,583,410

SEAT STRUCTURE

William E. Burnett, Montclair, N. J., assignor to American Car and Foundry Company, New York, N. Y., a corporation of New Jersey Application January 3, 1947, Serial No. 720,122

5 Claims. (Cl. 155—5)

This invention relates to seats and particularly to folding and shiftable seats.

In various types of small rooms, such as railway sleeping car compartments, available space is limited and must therefore be used with economy in order to permit placement of the necessary articles of furniture and other facilities. This condition often requires that the seat be so designed as to be capable of folding or shifting to an out-of-the-way or lowered position when not in use so as not to interfere with other articles of furniture, such as a bed, when in position for use, since lack of space prevents the seat and bed both being used at the same time. This is particularly true in that type of sleeping car compartment provided with a swingably or slidably mounted bed which is operable from a stored position, where it is placed when not in use, to a position for use where it occupies the greater part of the compartment space. It is an object of the present invention to provide a seat capable of meeting the above requirements.

Another object of the invention is the provision of a seat for a small room capable of being folded vertically to a lowered or out-of-the-way position where it occupies a minimum amount of space and is cleared by the bed when the latter is in position for occupancy.

A further object of the invention is the provision of a seat for a small room capable of shifting laterally while being vertically folded to the lowered position in order to be cleared by a bed during operation of the latter from one position to the other.

A still further object of the invention is the provision of a folding seat structure in which a folding back serves as an actuating or operating lever to move the seat toward and away from its out-of-the-way position.

These and other objects of the invention will be apparent to those skilled in the art from a study of the following description and accompanying drawings, in which:

Figure 1 is a side elevational view of a seat incorporating the present invention and showing the seat in broken lines when in the lowered or out-of-the-way position;

Fig. 2 is a front elevational view of the seat, certain parts being broken away to better disclose other parts; this view also showing the seat in broken lines when in the lowered or out-of-use position;

Fig. 3 is a side elevational view of one of the front seat supporting pedestals, a portion thereof being broken away to better disclose structural details;

Fig. 4 is a top plan view of the pedestal of Fig. 3;

Fig. 5 is a side elevational view of one of the rear pedestals, and

Fig. 6 is a top plan view of a rear pedestal.

Referring now to the drawings, the seat structure comprises a seat frame 2 and a back frame 4, which carry or support, respectively, the seat cushion 6 and back 8. These frames may be of any suitable or desired form, but as shown they consist of hollow members substantially square in cross section, and may be made of any sufficiently strong, light metal.

The back frame is pivotally mounted on the seat frame by means of brackets 10 and 12, a pair of these brackets being secured to the opposite sides, respectively, of the seat and back frames. The brackets 10 may be welded or bolted, as indicated at 14, to the seat frame, while the brackets 12 are similarly connected, as at 16, to the back frame. Each pair of brackets 10 and 12 are pivotally connected to each other, as indicated at 18, thus pivotally mounting the back to fold down on the cushion 6, as shown by broken lines in Fig. 1.

The seat frame 2 and its cushion 6 constitute what is hereinafter referred to as a seat, designated by the numeral 20. The seat when in normal or upright position is slightly rearwardly inclined and is pivotally supported by a pair of front legs 22 and a pair of rear legs 24, pivotally connected at one end to the seat frame 2, as shown at 26, and at the other end to front and rear supporting pedestals 28 and 30, as indicated at 32, the pedestals in turn being secured to the compartment floor 34 by the wood screws 36. It will be seen that the seat structure is thus pivotally mounted for movement to a lowered out-of-use position on the compartment floor, as shown in broken lines.

When the seat structure is in upright or seating position, as shown by full lines in Fig. 2 it occupies substantially all of the space between the bed 38 when the latter is in stored position, as shown in full lines, and a closet or aisle wall (not shown). The bed 39 is pivotally and slidably mounted for swinging movement between stored position and in-use position by means of the trunnion members 39 secured to the bed and riding in guide tracks (not shown) provided in the compartment walls. The bed when in position for occupancy is shown by broken lines in Fig. 2, movement of the bed from one position to the other requiring a certain amount of clearance, the path of movement of the low point of the bed being indicated by the broken curved line 40. It will be understood that the path of movement of the bed from one position to the other intersects the space which would be occupied by the seat structure when folded if the latter were restricted only to vertical folding movement. It will seen, therefore, that the seat must also be capable of shifting slightly laterally to one side or to the left as viewed in Fig. 2, when moved to the out-of-the-way or stored position, in order to be cleared by the bed during movement of the latter from one position to the other. This lateral shifting of the seat is accomplished by reason of the fact that the legs 22 and 24 are pivotally connected on the bias to the pedestals 28 and 30; as shown by line 42 in Fig. 4. It will be understood that the pivotal connections 26 of the legs 22 and 24 with the seat frame 2 are also on the bias, being parallel with the pivotal connections 32 of the legs with the pedestals, so that the seat structure when moved rearwardly and downwardly in a vertical direction will also move slightly laterally in a direction away from the bed, to lowered position, as shown by broken lines in Fig. 2. The seat structure is then slightly shifted to one side and in such position will be cleared by the bed during movement of the latter from one position to the other.

To further accommodate movement of the bed, the sides of the back 8 are beveled or inclined, tapering toward the rear face of the back, as indicated at 44 in Fig. 2, which shows the back in broken lines when in folded position, thus permitting the back to be cleared by the bed without sacrificing any width of the back for accommodating a passenger. In addition, to compensate for the lateral movement of the seat structure when shifted to stored position, the rear pedestals 30 are of the type shown in Figs. 5 and 6 having the pivotal point for the legs 24 located at one side of the pedestals, as indicated at 46. It will be understood that only the inner rear pedestal, on the side opposite from the bed when the latter is in stored position, has to be cleared by the seat structure when the latter is shifted to the lowered position; however, both rear pedestals are of the same type for the sake of uniformity and interchangeability. To permit the seat structure when shifted from one position to the other to clear the inner rear pedestal, the latter is positioned further to one side than is the inner front pedestal, as indicated at 48 in Fig. 2. It will be seen that the location of the inner rear pedestal in this position compensates for the lateral movement of the seat, enabling the latter when shifted to the lowered or stored position to clear the pedestal. In order to permit the seat cushion 6 when in lowered position to clear the rear pedestals, the sides of the cushion are cut away from the seating surface thereof, as indicated at 50 in Fig. 2. In this way the cushion is enabled to clear the normally interfering rear pedestal without having to sacrifice any of the width of the top or seating surface of the cushion. While it is only necessary to cut away the side of the cushion next to the inner rear pedestal, both sides of the cushion are cut away so that the cushion for opposite sides of the car can be interchanged.

The pedestals 28 and 30 are formed to provide abutments or stops 52 against which the legs 22 and 24 bear when the seat is in upright position. The legs, when supporting the seat in upright position, have swung past center and are positioned at a slight angle forward of the pivotal points 32, as viewed in Fig. 1, the abutments 52 acting as stops for the legs preventing further forward movement of the seat and retaining the latter in upright position. The front pedestals 28 are also each formed with a depression or pocket 54 for the reception of a torsion spring 56 having an arm 58 bearing against the adjacent leg 22 and constantly urging the latter toward upright seat position. The spring is of a strength to barely counterbalance the weight of the seat structure when in lowered position, thereby substantially easing its operation to upright or seating position. The rear legs 24 are slotted, as shown at 60, to receive pins 61 on the seat frame 2 permitting relative sliding movement between the rear legs and seat frame during movement of the seat structure from one position to the other.

A pair of anchor links 62 are pivotally connected at one end, as shown at 64, to the back of the seat back, and have their other end pivotally connected as at 66 to an adjacent vertical wall 68 of the compartment. The links 62 are of such length and the points of their pivotal connection to the back and compartment wall are so chosen, that when the back is swung to folded position the seat 20 will be caused to move rearwardly and downwardly toward lowered stored or out-of-use position. The pivotal connections of these anchor links with both the back and wall are also on the bias, similar to the connections of the legs with the pedestals and seat frame 2, in order to accommodate the lateral or sidewise shifting of the seat when moved vertically from one position to the other. It will be noted from a study of Fig. 1 that during swinging of the seat back to folded position, it will be rotated about a shifting pivot or fulcrum 64, the back thus serving or acting as an actuating lever, through the pivot 18, to draw the seat 20 rearwardly and downwardly toward lowered position. After the back has been folded down over the seat, both may now be pushed together as a unit downwardly and slightly to the rear into fully lowered position, as shown by broken lines in Fig. 1.

As shown in Figs. 1 and 2, the back is provided with a combined operating handle and latch mechanism, the handle being generally of U-shape, having attaching portions 70 welded or otherwise secured to the back frame 4, and a pivoted upper portion 72. Spaced latch members 74 extend rearwardly from the pivoted portion 72 and are adapted to partially project, when in latching position, through an opening in a retainer plate 76 attached to the wall 68, in which position the latch members are in engagement with the plate 76. A leaf spring 78, secured to the inside of the retainer plate above the opening, serves to resiliently retain the latch members in latching position, and also as a cover for the opening in the plate when the latter is not engaged by the latch members 74. Thus the back, as well as the seat structure as a whole, is firmly retained in upright position. It will be seen that to shift the seat to stored position it is only necessary for one to grasp the handle portion 72, exerting a forward pull thereon, which will first rotate this member counter-clockwise, as viewed in Fig. 1, lifting the latches 74 against the pressure of spring 78, and then withdrawing the latches from the opening in the retainer plate, thus releasing the back for folding. When the back is swung from folded to upright position, these latches will enter the retainer plate opening against the tension of spring 78 and will be snapped by the spring into engagement with the retainer plate, thus securely locking the back, and hence the seat structure itself, in upright or seating position.

The seat structure may be provided with folding arm rests 80, one at each side of the back, pivoted at 82 to swing or fold into pockets 84 formed in the back, where they lie flush with the surface of the back when not in use.

While the invention has been described more or less in detail, it will be apparent to those skilled in the art that various modifications may be made without departing from the scope of the invention as defined in the following claims.

What is claimed is:

1. A seat structure for use in a room having a floor and a vertical wall comprising a seat, a back pivotally connected to said seat and foldable thereon, supporting legs pivotally connected with the seat and said floor mounting the seat for vertical swinging movement between an upright seating position and a lowered stored position on the floor, and a plurality of links pivotally anchoring an intermediate portion of said back to said wall and acting as a fulcrum whereby the back when being folded serves as an actuating lever to move said seat from one position to the other.

2. A seat structure comprising, in combination with the floor and a wall of a room, a seat, a back pivotally connected to said seat and mounted to swing to folded position thereon, supporting pedestals secured to the room floor, legs pivotally connected with the seat and said pedestals mounting the seat for vertical swinging movement between an upright seating position and a stored position on said floor, said pedestals being formed with stop means limiting forward movement of said legs when in upright seat supporting position, resilient means carried by said pedestals and constantly urging the associated legs toward upright seat supporting position, and link means pivotally anchoring an intermediate portion of said seat back to the room wall whereby the back when being folded serves as an actuating lever to move the seat to and from said positions.

3. A seat structure comprising, in combination with the floor and a wall of a room, a seat, a back pivotally connected to said seat and mounted to swing to folded position thereon, supporting pedestals secured to the room floor, legs pivotally connected with the seat and said pedestals mounting the seat for vertical swinging movement between an upright seating position and a stored position on said floor, the pivotal connection of said legs with the pedestals being on a horizontal axis extending at an angle to the transverse center line of the seat; to effect shifting of the seat in a sidewise direction relative to the longitudinal center line of the pedestals while being moved to and from stored position, and link means pivotally connecting an intermediate portion of the back to the room wall whereby the back when being folded acts as a lever to move the seat to and from its respective positions.

4. A seat structure comprising, in combination with the floor and a wall of a room, a seat, a back pivotally connected to said seat and mounted to swing to folded position thereon, supporting pedestals secured to the room floor, legs, means pivotally connecting the legs with said pedestals and seat whereby to mount the seat for vertical swinging movement between upright seating position and stored position on said floor, the axes of said pivot means being angularly disposed with relation to the transverse center line of the seat whereby to cause shifting of the seat in a relative sidewise direction during its movement from one position to the other, and link means pivotally connecting an intermediate portion of the back to the room wall whereby the back when being folded acts as an operating lever in moving said seat to and from said positions.

5. A seat structure comprising, in combination with the floor and a wall of a room, a seat, a back pivotally connected to said seat and mounted to swing to folded position thereon, front and rear legs pivotally connected with the seat and the room floor mounting the seat for vertical swinging movement between an upright seating position and a lowered stored position on said floor, said rear legs having a pin and slot connection with the seat to permit relative movement therebetween during movement of the seat between said positions, and link means pivotally anchoring an intermediate portion of said back to the room wall and acting as a fulcrum whereby the back when being folded serves as an actuating lever to move the seat from one position to the other.

WILLIAM E. BURNETT.

REFERENCES CITED

The following references are of record in the file of this patent:

UNITED STATES PATENTS

| Number | Name | Date |
|---|---|---|
| 515,686 | Hyller | Feb. 27, 1894 |
| 828,136 | Nichols | Aug. 7, 1906 |
| 1,062,010 | Jacobson | May 20, 1913 |
| 1,245,195 | Crane et al. | Nov. 6, 1917 |
| 1,683,327 | Bouharoun | Sept. 4, 1928 |
| 2,132,729 | Galamb et al. | Oct. 11, 1938 |

FOREIGN PATENTS

| Number | Country | Date |
|---|---|---|
| 249,708 | Italy | Aug. 7, 1926 |
| 301,614 | Great Britain | Dec. 6, 1928 |